Patented Dec. 14, 1948

2,456,268

UNITED STATES PATENT OFFICE 2,456,268

CATALYST PREPARATION

Frank C. Gibbs, Jr., Borger, Tex., Bruce M. Baird, Oklahoma City, Okla., and Robert J. Brosamer, United States Navy, assignors to Phillips Petroleum Company, a corporation of Delaware No Drawing. Application November 20, 1943, Serial No. 511,207

2 Claims. (Cl. 252—250)

The present invention relates to the preparation of catalytic materials and it deals more particularly with catalysts of the silica-alumina type comprising or consisting of silica and an oxide of a metal selected from the aluminum sub-group of group III or from the titanium sub-group of group IV of the periodic table, and with the preparation and use of such catalysts. It relates still more particularly to the activation of the silica by treatment with a solution of an aluminum salt or a salt of one of the other metals in the preparation of such catalysts.

Heretofore in the preparation of catalysts of the silica-alumina type, an acid hydrogel such as hydrous silica gel is first prepared and, before it is thoroughly dried or dehydrated, it is treated with an aqueous solution of a suitable metal salt. While the resultant product, after washing and drying, appears to consist of or comprise a mixture of silica and an oxide of the metal of the metal salt solution, nevertheless, this same product has not resulted from precipitation of a metal hydroxide or hydrous oxide upon an inert support, nor from the impregnation of a dried inert support with a metal salt and subsequent decomposition of the metal salt or precipitation of a decomposable compound from the metal salt, as when thoroughly dried pumice or silica gel is impregnated with aluminum nitrate and the resultant material is calcined or treated to precipitate aluminum as the hydroxide or carbonate or the like and subsequently calcined. Such catalytic materials comprising silica and various metal oxides have been described by Gayer (Industrial and Engineering Chemistry, vol. 25, page 1122), Perkins et al. (U. S. Patent No. 2,107,710), McKinney (U. S. Patents No. 2,142,324 and 2,147,985); Fulton and Cross (U. S. Patents No. 2,129,649; 2,129,732 and 2,129,733) and in the patents and the copending application of Hendrix and Chapman, United States Patent 2,342,196, issued February 22, 1944, and Serial No. 511,184, filed November 20, 1943, and Karl H. Hachmuth, United States Patent 2,349,904, issued May 30, 1944.

In general, catalysts of the silica-alumina type are prepared by first forming a silica gel or jelly from sodium silicate or other alkali-metal silicate and an acid, washing soluble material from the gel, partially but not completely drying the gel, treating or activating the partially dried gel with an aqueous solution of a suitable metal salt, and subsequently washing and drying the activated material. In this manner, a part of the metal, presumably in the form of a hydrous oxide or loose hydroxide compound formed by hydrolysis, is selectively adsorbed by the hydrous silica and is not removed by subsequent washing. This selective adsorption is attested by a decrease in the metal content of the activating solution as well as a decrease in pH of the activating solution as the activation progresses.

The most often used catalyst of this type, at present, is a silica-alumina catalyst, prepared by treating a wet or partially dried hydrous silica gel with a solution of an aluminum salt, such as a solution of aluminum chloride or aluminum sulfate, and subsequently washing and drying the treated material. However, catalysts of a very similar nature, but differing among themselves as to one or more specific properties, may be prepared by using, instead of an aluminum salt, a hydrolyzable salt of a metal selected from group III B or Group IV A of the periodic system. The hydrolyzable salts which are used are generally salts of these metals with strong inorganic acids such as sulfates and chlorides.

These catalysts may be referred to in general as catalysts of the silica-alumina type. More particularly, salts of indium and thallium in addition to aluminum in group III B may be used, and salts of titanium, zirconium and thorium in group IV A may be used to treat silica gel and to prepare catalysts of this general type. Boron in the form of boric acid, or a soluble borate such as sodium borate, may be incorporated with the silica gel.

It is an object of the present invention to provide an improved process 25 of producing a catalyst of the silica-alumina type.

A further object of the invention is to provide an improved process of effecting the activation of silica gel in the preparation of a catalyst of the silica-alumina type.

Other objects and advantages of the invention, some of which are specifically referred to hereinafter, will be apparent to those skilled in the art to which the invention appertains.

We have found that the activation of a silica gel with aluminum sulfate solution or a solution of another activating salt can be greatly facilitated by control of the acidity or pH of the activating solution during treatment of the silica gel therewith. This control of pH may be effected by addition to the activating solution of sodium acetate, sodium carbonate, sodium hydroxide or other suitable buffer salt. In the activation of a silica gel, for example, three or more treatments with an aluminum sulfate solution may be required to produce a catalyst of maximum catalytic activity. When sodium acetate is added to the aluminum sulfate solution, in accordance with one embodiment of the invention, a catalyst of maximum activity may be attained with two activation treatments. The addition of the buffer to the activating solution aids the adsorption or activation of the silica gel and reduces the number of treatments that are necessary. It does not, however, change the characteristics of the catalyst substantially nor does it change substantially the maximum to which the silica gel can be activated. That is, beyond a certain number of activation treatments, repeated treatments of the silica gel with activating solutions of aluminum sulfate or activating solutions of aluminum sulfate and buffer salts will not produce catalysts of greater activity. Approximately the same maximum activity is reached whether the activating solution contains or is free from buffer salts; the maximum activity is attained with fewer treatments when buffer salts are present and the catalyst is more active after each successive treatment, up to the point of maximum activity, when buffer salts are present.

The buffers which may be used for the control of the pH of the activating solution are strong bases and salts of strong bases and weak acids such as the sodium, potassium or other alkali-metal salts of acetic, propionic, butyric, tartaric, citric, carbonic and other weak organic acids and boric, phosphoric and similar weak inorganic acids. Whenever buffers or buffer salts are referred to herein we intend to include sodium hydroxide and other strong bases and salts of such bases with weak acids, as mentioned, unless they are specifically excluded. Specific buffers which are suitable and which are preferred are sodium acetate and sodium carbonate. On the addition of buffers to the activating solution, a precipitate of metal hydroxide may form; as long as a substantial proportion of the metal salt component of the solution remains unprecipitated and the precipitated metal hydroxide is kept uniformly distributed throughout the mixture, no deleterious effects will occur. It has been noted that the addition of a precipitated metal hydroxide, such as aluminum hydroxide, for example, to an aluminum sulfate activating solution does not act as a buffer and that the catalyst activity is not increased as a result of the presence of such aluminum hydroxide but is in fact decreased (see Example 5 Comparison hereinafter).

The quantity of buffer added should be such that the activating solution after treatment, that is, the spent activating solution, has a pH somewhat in excess of approximately 2.0. Generally this amount will be less than approximately 10% by weight of the solution although a greater proportion does not have a deleterious effect but does not substantially improve the effectiveness of the treatment. The amount of buffer salt which will be added in any specific case is dependent upon a great number of characteristics, some of which are (1) the characteristics of the silica gel which is to be activated, that is, its porosity, its "dryness," and its adsorptive capacity, etc., (2) the activating salt which is to be used, (3) the concentration of the activating salt in the activating solution, (4) the amount of salt or metal constituent which is adsorbed by the silica gel, and (5) the decrease of pH of the activating solution as the activation proceeds. It should be noted that when buffers are added, more activating constituent is adsorbed on the gel and that, if the buffer were not present, the pH would decrease at a more rapid rate. It is not possible to state any precise rules with respect to each of these factors and the optimum amount of buffer which is to be added in any specific case will be judged largely on the basis of prior experience, except that, within the range of approximately 1% to approximately 10% by weight of buffer in the activating solution, improved, though not necessarily optimum, results will be obtained.

The invention contemplates no substantial change in the conventional and heretofore described methods of preparing catalysts of the silica-alumina type other than in the activation treatment of the silica gel as stated herein. Any of the hereinbefore specified methods of preparing the silica gel and treatments after activation may be used which are suitable for the preparation of the particular desired catalyst. As a result of the use of buffers in the activating solution, however, it is possible to use activating solutions of higher concentration than was heretofore possible. Activating solutions containing 1 pound of aluminum sulfate per gallon of water were heretofore used. Such concentration constituted a compromise between the amount it was desired to incorporate in the catalyst and the number of treatments it would require to effect such incorporation. When weaker solutions were used, a greater or excessive number of activating treatments was required and when more concentrated solutions were used there was not a proportional adsorption of aluminum compound on the gel. The spent activating solutions are ordinarily not reused.

When buffer salts are used in the activating solution, in accordance with the process of the present invention, it is possible to effect the adsorption of a greater amount of aluminum compound on the silica gel in a single treatment than would be adsorbed from a solution of the same concentration containing no buffer salts. As a consequence of the use of buffer salts, it is possible, therefore, to use solutions containing greater concentrations of activating salts and thereby reduce also the number of activating treatments that are required.

Although the invention is described hereinabove in the examples with particular relation to activating solutions comprising aluminum sulfate, the buffers may be used in activating solutions comprising other hydrolyzable salts of metals of groups III-B and IV-A of the periodic system such as in solutions of aluminum chloride, titanium chloride, zirconium chloride, etc.

In the examples which follow, the various catalysts were prepared, except for the activation treatments, according to one of the general procedures described in the application of Hurshel V. Hendrix and Charles C. Chapman, Serial No. 511,184, filed November 20, 1943. The preparation was as follows:

Twenty-two (22) volumes of an aqueous sodium silicate solution having a specific gravity of 22° Baumé is added slowly with stirring to 25 volumes of an aqueous solution of sulfuric acid having a specific gravity of 21° Baumé. The solution of sodium silicate is added at such a rate that the temperature of the mixed solutions does not exceed approximately 80° F., cooling being used, if necessary. After the solutions have been completely mixed the material is allowed to stand until it has set to a gel, which will be approximately 1 or 2 hours, and is allowed to age for several hours and then broken up and washed with water at a temperature not substantially in excess of 80° F. until the pH of the effluent wash water is within the range of approximately 2.0 to approximately 2.15.

After the hydrous silica gel has been washed it is partially dried to a moisture content within the range of approximately 10 to approximately 16% by weight (moisture determined by loss of weight on heating the gel to 270° F. for 16 hours). The partially dried gel is then washed with water at a temperature below approximately 80° F. until the pH of the wash water is approximately 3.0 or higher.

The gel is then subjected to activation treatment. The activation without a buffer salt in the activating solution may be conducted as follows: The washed gel is covered with an aluminum sulfate solution containing 1 pound of aluminum sulfate (calculated as anhydrous $Al_2(SO_4)_3$) per gallon of solution. This solution is heated to 210° F. with live steam and circulated through the catalyst bed by means of a steam jet for two hours. The spent solution is drained off and the gel is washed with water at a temperature not substantially in excess of 80° F. until the pH of the effluent wash water is approximately 3.0. The activation treatment is then repeated, followed by washing. The washing after the second activation is conducted to a pH of the effluent wash water within the range of 3.2 to 4.0 and after the third activation until the pH of the effluent wash water is approximately 3.6 to 4.7. The activity after each activation is illustrated in the following table in which is tabulated the activity of finished catalysts whose preparation was completed after 1, 2, 3 and 4 such activating treatments, respectively. The activity of the respective catalysts is expressed as "cc./4 hours" which designates the number of cubic centimeters of polymer formed in a four-hour test period when propylene gas is passed over a standard (5 cc.) test portion of the catalyst under standardized conditions of flow rate, temperature, and pressure.

| Number of Activation Treatments | Activity, cc./4 hour |
| --- | --- |
| 1 | 3.3 |
| 2 | 5.8 |
| 3 | 6.7 |
| 4 | 7.3 |

After washing the activated gel, it is then dried until the moisture content is approximately 7 to 8% by weight of the gel. This drying is conducted at a temperature below approximately 225° F., as disclosed in the copending application of Karl H. Hachmuth, United States Patent 2,349,904, issued May 30, 1944.

Example 1

The general procedure for the preparation of catalyst as described directly hereinabove was used but the activation was conducted as follows:

The partially dehydrated silica gel after washing was treated with an activating solution comprising 2 pounds per gallon of aluminum sulfate $(Al_2(SO_4)_3)$ and 5% by weight of sodium acetate. The solution during activation was at a temperature of about 210° F. and remained in contact with the gel for about 2 hours. The pH of the spent activating solution was 2.91 and the activity of the finished catalyst was 6.3 cc./4 hours.

*Comparison.*—When the activation was conducted with an activating solution containing the same concentration of aluminum sulfate but no sodium acetate, the pH of the spent activating solution was 1.60 and the activity of the finished catalyst was 4.0 cc./4 hours.

Example 2

The procedure of Example 1 was repeated, using for the activation an activating solution containing 2 pounds of aluminum sulfate per gallon of solution and 10% by weight of sodium acetate. The pH of the spent activating solution was 2.88 and the resulting catalyst had an activity expressed as 6.1 cc./4 hours.

Example 3

Example 1 was repeated, except that instead of using 5% sodium acetate in the activating solution, only 2.5% by weight was used and the aluminum sulfate concentration was dropped to 1 pound of aluminum sulfate per gallon. The pH of the spent catalyst solution was 2.75 and the activity of the resulting catalyst was 5.5 cc./4 hours.

Example 4

An activating solution comprising 2 pounds of aluminum sulfate per gallon and 5% by weight of sodium hydroxide was used. Aluminum hydroxide precipitated in the activating solution on adding the sodium hydroxide and was kept distributed throughout the batch by stirring. In other respects the procedure was the same as that used in Example 1. The pH of the spent activating solution was 3.34 and its activity corresponded to 7.0 cc./4 hours.

*Comparison.*—When the sodium hydroxide was omitted from the activating solution and the preparation was conducted in exactly the same manner, the pH of the spent activating solution was 1.66 and the catalyst had an activity of 4 5 cc./4 hours.

Example 5

Example 4 was repeated but 8% instead of 5% sodium hydroxide was used in the activating solution. Aluminum hydroxide was precipitated as an Example 4 and was kept stirred throughout the activation treatment. The pH of the spent activating solution was 3.43 and the catalyst had an activity of 7.0 cc./4 hours.

*Comparison.*—In connection with Examples 4 and 5, an activating solution comprising 2 pounds of aluminum sulfate per gallon and 1.5% by weight of freshly precipitated and washed aluminum hydroxide was used. The pH of the spent activating solution was 2.20 and the activity of the resulting catalyst was 2.1 cc./4 hours.

An activating solution containing somewhat more freshly precipitated aluminum hydroxide (3% by weight) was also tried. The resulting catalyst had an activity of 1.1 cc./4 hours. After washing the activated catalyst gel and before drying it, a sample thereof was mixed with 15% by weight of freshly precipitated aluminum hydroxide and then dried. This preparation gave an activity value of 1.0 cc./4 hours.

Although in the foregoing examples only one activating treatment is shown it is to be understood that the gel may be subjected to several activation treatments to attain maximum activity in the catalyst. It is furthermore to be understood that the foregoing specification comprises preferred embodiments of the invention and that the invention is not limited thereto except as defined in the appended claims.

We claim:

1. A process for the preparation of a silica-alumina catalyst which comprises forming a hydrous silica gel by adding a solution of sodium silicate to an aqueous acid solution, washing and partially drying said hydrous gel, washing the partially dried gel until the acidity of the final wash water is reduced to pH value of at least about three, thereafter subjecting the resulting washed gel to the action of an aqueous acid activating solution consisting essentially of aluminum sulfate and an effective amount of a compound selected from the group consisting of alkali-metal bases and salts of alkali-metal bases and weak acids to maintain the acidity of said acid activating solution at a pH above about two during the entire activation treatment and so that the acidity of the spent acid activating solution at the end of said activation remains at a pH above about two, and subsequently washing and drying said activated gel.

2. In a process for the preparation of a silica-alumina catalyst which comprises forming a hydrous silica gel by the interaction of an acid with a solution of sodium silicate, washing and partially drying said hydrous silica gel, washing said partially dried gel until the acidity of the final wash water is reduced to a pH value of at least about three, thereafter subjecting the resulting washed gel to the action of an aqueous acid activating solution consisting essentially of aluminum sulfate, and subsequently washing and drying said activated gel, the improvement in said activation treatment which comprises adding to said acid activating solution 1 to 10% by weight of sodium acetate so that the acidity of said acid activating solution is maintained at a pH above about two during the entire activation treatment and so that the acidity of the spent acid activating solution at the end of said activation remains at a pH above about two.

FRANK C. GIBBS, Jr.
BRUCE M. BAIRD.
ROBERT J. BROSAMER.

REFERENCES CITED

The following references are of record in the file of this patent:

UNITED STATES PATENTS

| Number | Name | Date |
|---|---|---|
| 1,986,557 | Connolly et al. | Jan. 1, 1935 |
| 2,068,016 | Gayer | Jan. 19, 1937 |
| 2,147,985 | McKinney | Feb. 21, 1939 |
| 2,215,305 | Voorhies | Sept. 17, 1940 |
| 2,247,820 | Ruthruff | July 1, 1941 |
| 2,257,157 | Connolly | Sept. 30, 1941 |
| 2,258,786 | Melaven | Oct. 14, 1941 |
| 2,258,787 | Melaven | Oct. 14, 1941 |
| 2,265,388 | Melaven et al. | Dec. 9, 1941 |
| 2,265,389 | Melaven | Dec. 9, 1941 |
| 2,270,090 | Thomas | Jan. 13, 1942 |
| 2,270,912 | Melaven et al. | Jan. 20, 1942 |
| 2,320,799 | Ruthruff | June 1, 1943 |
| 2,342,196 | Hendrix et al. | Feb. 22, 1944 |
| 2,344,911 | Young | Mar. 21, 1944 |

OTHER REFERENCES

Hackh, "A Chemical Dictionary," P. Blakiston's Son & Co., Inc., Philadelphia, 1929.

Williams, "Introduction to Bichemistry" D. Van Nostrand, New York, 1931, pages 21-23.

Certificate of Correction

Patent No. 2,456,268.  December 14, 1948.

FRANK C. GIBBS, Jr., ET AL.

It is hereby certified that error appears in the printed specification of the above numbered patent requiring correction as follows:

Column 6, lines 44 and 45, for "4 5 cc./4 hours" read *4.5 cc./4 hours*;

and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*